US012572633B2

(12) United States Patent

Veeramreddy et al.

(10) Patent No.: US 12,572,633 B2

(45) Date of Patent: Mar. 10, 2026

(54) SYSTEM AND METHOD FOR GRIP GESTURE AUTHENTICATION BASED ON PRESSURE GRADIENT MAPPING

(71) Applicant: Bank of America Corporation, Charlotte, NC (US)

(72) Inventors: Sudarshan Veeramreddy, Hyderabad (IN); Banupriya B, Katpadi (IN); Lopamudra Dalai, Hyderabad (IN); Priya Gadde, Hyderabad (IN); Honey Gautam, Jaipur (IN)

(73) Assignee: Bank of America Corporation, Charlotte, NC (US)

( * ) Notice: Subject to any disclaimer, the term of this patent is extended or adjusted under 35 U.S.C. 154(b) by 48 days.

(21) Appl. No.: 18/793,094

(22) Filed: Aug. 2, 2024

(65) Prior Publication Data

US 2026/0037607 A1 Feb. 5, 2026

(51) Int. Cl.
    G06F 21/31 (2013.01)

(52) U.S. Cl.
    CPC .................................. G06F 21/316 (2013.01)

(58) Field of Classification Search
    CPC ...................................................... G06F 21/316
    See application file for complete search history.

(56) References Cited

U.S. PATENT DOCUMENTS

| | | | |
|---|---|---|---|
| 7,609,862 B2 | 10/2009 | Black | |
| 8,805,028 B2 | 8/2014 | Miura et al. | |
| 9,122,456 B2 | 9/2015 | Kamin-Lyndgaard et al. | |
| 9,575,557 B2 | 2/2017 | Tartz et al. | |
| 9,619,030 B2 | 4/2017 | Ciesla | |
| 9,870,083 B2 | 1/2018 | Hinckley et al. | |
| 9,961,547 B1 | 5/2018 | Molina-Markham et al. | |
| 10,028,676 B2 | 7/2018 | Freeman et al. | |
| 10,168,827 B2 | 1/2019 | Hinckley et al. | |
| 10,488,996 B2 | 11/2019 | Rosenberg et al. | |
| 10,620,724 B1 * | 4/2020 | Vukovic | ................. G06F 3/038 |
| 10,817,173 B2 * | 10/2020 | DeBates | ............. G06F 3/04883 |
| 10,831,246 B2 | 11/2020 | DeBates et al. | |
| 10,866,683 B2 * | 12/2020 | Gupta | ................... H04M 1/026 |
| 11,016,611 B2 * | 5/2021 | Heo | ....................... G06F 3/0412 |
| 2015/0161369 A1 | 6/2015 | Weksler et al. | |
| 2019/0204929 A1 * | 7/2019 | Attari | .................... G06F 3/0414 |

* cited by examiner

*Primary Examiner* — Han Yang

(57) ABSTRACT

A system for performing user authentication receives a request to perform an interaction, accesses sensor data of a first grip gesture performed by a user, wherein the first grip gesture is associated with the request, wherein the sensor data includes at least pressure data captured by pressure sensors, generates a first pressure gradient mapping for the first grip gesture based on the sensor data, determines whether the first pressure gradient mapping matches at least one of the registered pressure gradient mappings corresponding to registered grip gestures associated with the user based on a comparison between the first pressure gradient mapping and each of the registered pressure gradient mappings, approves the interaction if the first pressure gradient mapping matches at least one of the registered pressure gradient mappings, and declines the interaction if the first pressure gradient mapping does not match at least one of the registered pressure gradient mappings.

20 Claims, 4 Drawing Sheets

100

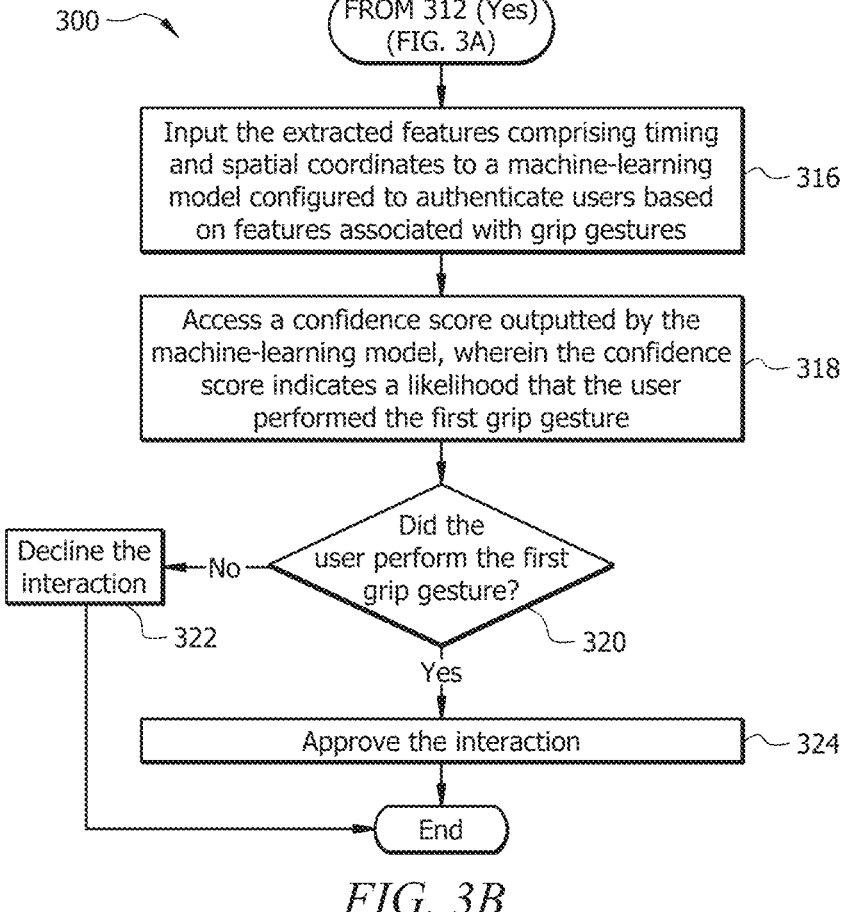

300

FROM 312 (Yes)
(FIG. 3A)

Input the extracted features comprising timing
and spatial coordinates to a machine-learning
model configured to authenticate users based
on features associated with grip gestures — 316

Access a confidence score outputted by the
machine-learning model, wherein the confidence
score indicates a likelihood that the user
performed the first grip gesture — 318

Did the
user perform the first
grip gesture? — 320

Decline the
interaction — No

322

Yes

Approve the interaction — 324

End

*FIG. 3B*

SYSTEM AND METHOD FOR GRIP GESTURE AUTHENTICATION BASED ON PRESSURE GRADIENT MAPPING

TECHNICAL FIELD

The present disclosure relates generally to biometric authentication, and more specifically, to a system and method for grip gesture authentication based on pressure gradient mapping.

BACKGROUND

Authentication is the process of verifying an identity, such as the identity of a user of a computer system. Authentications may be required for different real-world applications. Authentications may be performed based on different approaches. For example, a user may have to enter a pin, a password, a one-time password (OTP), or use fingerprint for authentication. Entering a pin, password, or OTP may create friction while fingerprint authentication may not be preferred by many users due to privacy concerns.

SUMMARY

The system disclosed in the present application provides a technical solution to the problems discussed above. The disclosed system can improve authentication by using grip gestures to authenticate interactions. When a user performs a grip gesture on a user device, such as holding a phone in a specific way or applying pressure to certain areas of the screen or device body, the sensors on the user device can detect the pressure exerted by the user's grip. An authentication system can then map the pressure gradients across the surface of the user device to generate a grip pressure mapping. The user can register one or more grip gestures, which can be subsequently used to authenticate interactions. When a user requests to authenticate an interaction, the authentication system may access sensor data corresponding to the user's grip gesture associated with the authentication request. The sensor data can be analyzed to generate a pressure gradient mapping. The authentication system may further compare the generated pressure gradient mapping with stored pressure gradient mappings corresponding to previously registered grip gestures. If there is a match, the authentication system may approve the interaction. Otherwise, the authentication system may decline the interaction.

In one embodiment, the disclosed system for performing user authentication includes a memory operable to store one or more registered pressure gradient mappings corresponding to one or more registered grip gestures associated with a user. The disclosed system also includes a processor operably coupled to the memory. The processor is configured to receive a request to perform an interaction. The processor is then configured to access sensor data associated with a first grip gesture performed by the user. The first grip gesture is associated with the request to perform the interaction. The sensor data includes at least pressure data captured by one or more pressure sensors. The processor is then configured to generate, based on the sensor data, a first pressure gradient mapping for the first grip gesture. The processor is then configured to determine whether the first pressure gradient mapping matches at least one of the registered pressure gradient mappings based on a comparison between the first pressure gradient mapping and each of the one or more registered pressure gradient mappings. If the first pressure gradient mapping matches at least one of the registered pressure gradient mappings, the processor is configured to approve the interaction. If the first pressure gradient mapping does not match at least one of the registered pressure gradient mappings, the processor is configured to decline the interaction.

The processor of the disclosed system is further configured to extract one or more features from the first pressure gradient mapping. The one or more features are based one or more of an intensity, a location, or a spread of pressure points. The comparison between the first pressure gradient mapping and each of the one or more registered pressure gradient mappings is based on the extracted features.

The processor of the disclosed system is further configured to calculate a respective score for the comparison between the first pressure gradient mapping and each of the one or more registered pressure gradient mappings. Each score indicates a distribution difference between the first pressure gradient mapping and each of the one or more registered pressure gradient mappings. The processor is then configured to determine whether each of the scores is within a threshold value. Determining whether the first pressure gradient mapping matches at least one of the registered pressure gradient mappings is further based on whether each of the scores is within the threshold value.

In one embodiment, generating the first pressure gradient mapping includes calculating, based on a Gaussian function, a plurality of gradients corresponding to pressure changes across a sensor surface associated with a user device on which the user performed the first grip gesture. The Gaussian function is based on a plurality of parameters. The processor of the disclosed system is further configured to transmit instructions for prompting the user to register grip gestures for authentication. The processor is then configured to access sensor data associated with a plurality of grip gestures performed by the user. The processor is then configured to determine the plurality of parameters based on a calibration of the sensor data.

In one embodiment, the memory is further operable to store a machine-learning model configured to authenticate users based on features associated with grip gestures. The processor of the disclosed system is further configured to extract one or more features from the sensor data, wherein the one or more features comprise one or more of pressure distribution, timing, or spatial coordinates. The processor is then configured to determine whether the user performed the first grip gesture by inputting the extracted features to the machine-learning model. The machine-learning model outputs a confidence score indicating a likelihood that the user performed the first grip gesture. If the user performed the first grip gesture, the processor is configured to approve the interaction. If the user did not perform the first grip gesture, the processor is configured to decline the interaction. In one embodiment, the processor of the disclosed system is configured to normalize the extracted features based on one or more of scaling pressure values associated with pressure distribution, standardizing timing, or standardizing spatial coordinates. In one embodiment, the processor is configured to access sensor data associated with a plurality of grip gestures performed by a plurality of users. The processor is then configured to train, based on the accessed sensor data, a baseline machine-learning model for authenticating users based on grip gestures. The processor is then configured to generate the machine-learning model by finetuning the baseline machine-learning model based on sensor data associated with grip gestures performed by the user.

The disclosed system and methods provide the practical application of improving efficacy, user experience, and security for authentications by using grip gestures to authenticate interactions. Prior systems may conduct authentication utilizing a pin/password or fingerprint, which may result in frictions and security concerns. The disclosed system and methods can address such problems by utilizing grip gestures for authentications. As described in embodiments of the present disclosure, an authentication system analyzes sensor data captured by a user device while a user performs a grip gesture on the user device, generates a pressure gradient mapping based on the sensor data corresponding to the grip gesture, compares the pressure gradient mapping with stored 20 pressure gradient mappings that were registered by the user previously, and determines whether to authenticate an interaction based on the comparison. As the grip gesture is unique to each user (i.e., each user holds and interacts with their user device in a unique way) and is difficult to replicate or guess, authentications based on grip gestures can ensure the right user is making the interaction to prevent incorrect authentications. In addition, utilizing grip gestures for authentications can provide a higher level of security compared to traditional authentication methods.

Technical advantages of certain embodiments of this disclosure may include one or more of the following. By utilizing grip gestures, the disclosed system and methods can provide dynamic security for authentications as the natural dynamics of a user's hand movements can create intuitive and secured authentications. By generating pressure gradient mappings, the disclosed system and methods can reduce noise in sensor data and interpolate the sensor data to predict values at unsampled points. Furthermore, the disclosed system and methods do not require memorization or manual input and grip gestures can be performed quickly and discreetly, which makes the authentication process more seamless and convenient for users. Thus, the disclosed system and methods generally improve the technology associated with authentications.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A-3B illustrate an example flowchart of a method for grip gesture authentication.

DETAILED DESCRIPTION

Figure 1:
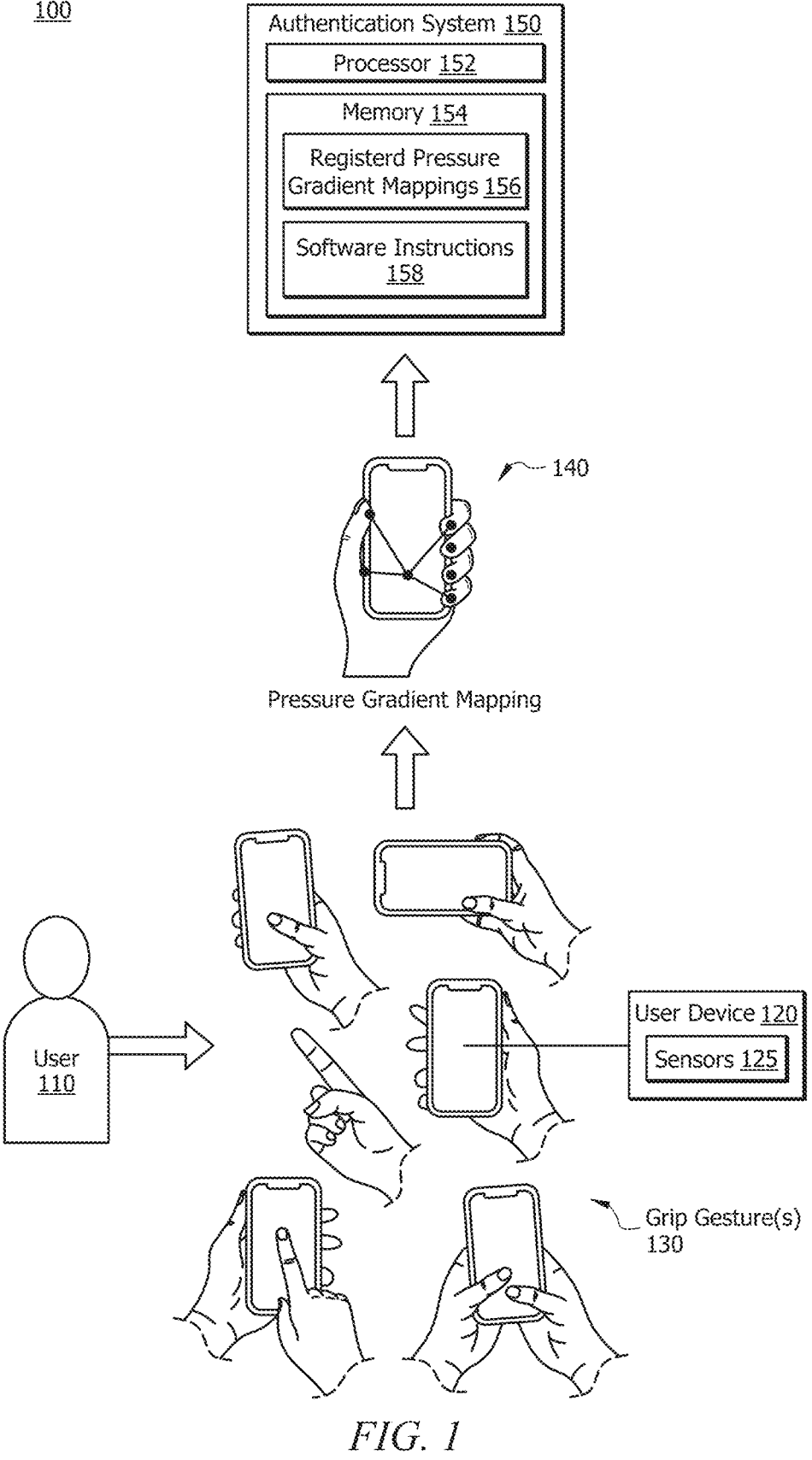
FIG. 1 illustrates an example system configured for grip gesture authentication.
Figure 2:
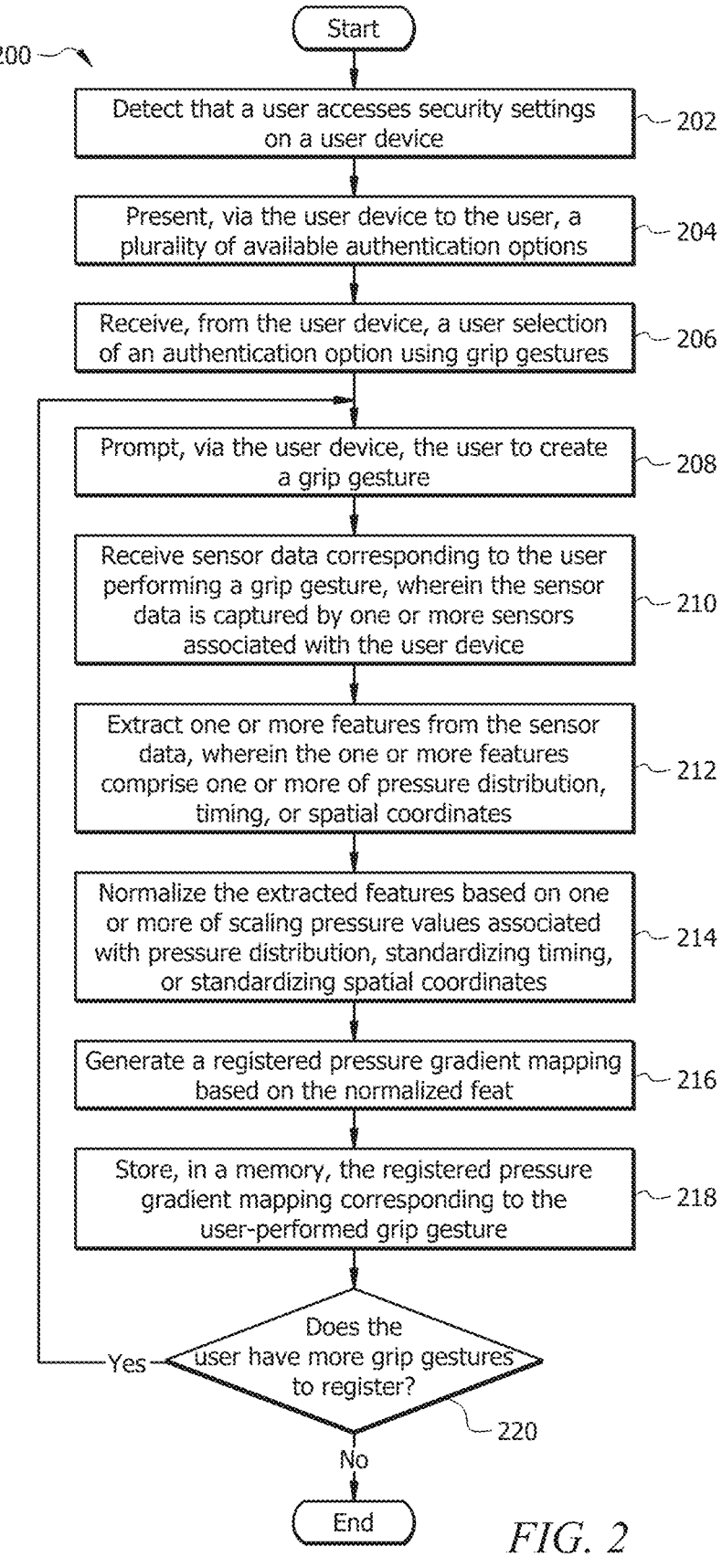
FIG. 2 illustrates an example flowchart of a method for grip gesture registration.
Figure 3A:
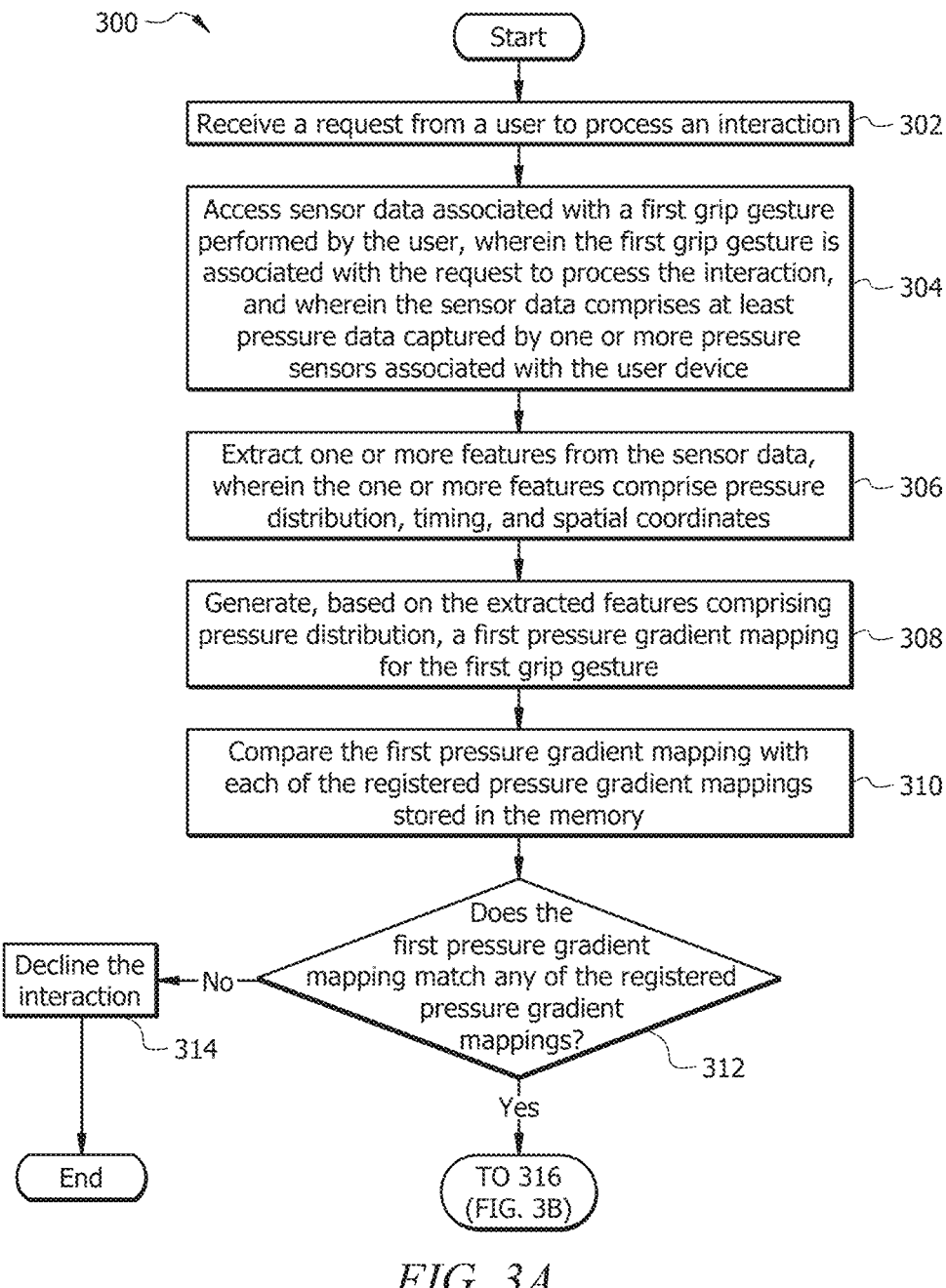

As described above, previous technologies fail to provide frictionless authentications. This disclosure provides various systems and methods to provide frictionless and privacy-enhanced authentications by using grip gesture authentications. FIG. 1 illustrates a system 100 configured for grip gesture authentication. FIG. 2 illustrates an example flowchart of a method for grip gesture registration. FIGS. 3A-3B illustrate an example flowchart of a method for grip gesture authentication.

Example System for Grip Gesture Authentications

FIG. 1 illustrates one embodiment of a system 100 that is configured for grip gesture authentication. System 100 comprises an authentication system 150. In some embodiments, system 100 further comprises a user device 120. A user 110 may operate the user device 120 and request authentications of interactions via the user device 120. In other embodiments, system 100 may not have all of the components listed and/or may have other elements instead of, or in addition to, those listed above.

System Components

Authentication System

Authentication system 150 is generally any device that is configured to process data and communicate with devices (e.g., user device 120), databases, systems, etc. Authentication system 150 is generally configured to perform operations described further below in conjunction with method 200 described in FIG. 2 and method 300 described in FIGS. 3A-3B. In an embodiment, authentication system 150 comprises a processor 152 in signal communication with a memory 154.

Processor 152 comprises one or more processors operably coupled to the memory 154. Processor 152 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 152 may be a programmable logic device, a microcontroller, a microprocessor, or any suitable combination of the preceding. Processor 152 is communicatively coupled to and in signal communication with memory 154 and user device 120. Processor 152 is configured to process data. For example, processor 152 may be 8-bit, 16-bit, 32-bit, 64-bit or of any other suitable architecture. Processor 152 may include an arithmetic logic unit (ALU) for performing arithmetic and logic operations, processor registers that supply operands to the ALU and store the results of ALU operations, and a control unit that fetches software instructions 158 from memory 154 and executes them by directing the coordinated operations of the ALU, registers and other components. Processor 152 is configured to implement various software instructions 158. For example, processor 152 is configured to execute software instructions 158 to implement the functions disclosed herein, such as some or all of those described with respect to FIGS. 1-3. In some embodiments, the function described herein is implemented using logic units, FPGAs, ASICS, DSPs, or any other suitable hardware or electronic circuitry.

Memory 154 may be volatile or non-volatile and may comprise a read-only memory (ROM), random-access memory (RAM), ternary content-addressable memory (TCAM), dynamic random-access memory (DRAM), and static random-access memory (SRAM). Memory 154 may be implemented using one or more disks, tape drives, solid-state drives, and/or the like. Memory 154 is operable to store registered pressure gradient mappings 156 for different users 110. Memory 154 also stores the software, and/or any other data or software instructions 158. The software instructions 158 may comprise any suitable set of instructions, logic, rules, or code operable to execute the processor 152. The software instructions 158, when executed by the processor 152, cause the processor 152 to perform one or more functions described herein. For example, when the software instructions 158 are executed, the processor 152 executes the software instructions 158 to conduct grip gesture authentication for interactions by utilizing sensor data from user device 120 and registered pressure gradient mappings 156 in the memory 154.

User Device

Examples of user device 120 include, but are not limited to, computers, laptops, mobile devices (e.g., smart phones or tablets), servers, clients, or any other suitable type of device. User device 120 comprises one or more sensors 125. In an embodiment, the sensors 125 comprise pressure sensors. The pressure sensor may be embedded throughout the user device 120 around the periphery on the screen/display, in the back, on the buttons, or the locations wherever a user 110 would normally press or hold the user device 120. The pressure sensors can capture pressure exerted by a user's fingers/hand.

The user device 120 is generally configured to capture data and send instructions for processing the data to the authentication system 150. For example, the data may comprise sensor data captured by sensors 125 and data associated with an interaction and the instructions may comprise a request for authenticating the interaction. In other examples, the data may comprise any suitable type of data. The instructions may comprise any suitable type or number of commands for processing the data. The user device 120 is further configured to receive feedback based on processing results from the authentication system 150 and present the feedback to the user 110. For example, the feedback may indicate whether an authentication for an interaction is successful.

Operational Flow for Grip Gesture Authentication

When user 110 initiates a request for interaction processing on the user device 120, user 110 may perform a grip gesture 130 on the user device 120. The performed grip gesture 130 may be correspond to one of the plurality of registered grip gestures 130. The sensors 125 of the user device 120 capture sensor data corresponding to the performed grip gesture 130.

Authentication system 150 then processes the sensor data to generate a pressure gradient mapping 140. Authentication system 150 then compares the pressure gradient mapping 140 with registered pressure gradient mappings 156. If the pressure gradient mapping 140 matches any of the registered pressure gradient mappings 156, authentication system 150 approves the interaction. Authentication system 150 may further provide feedback to the user 110 that the authentication is successful. If the pressure gradient mapping 140 does not match any of the registered pressure gradient mappings 156, authentication system 150 declines the interaction. Authentication system 150 may further provide feedback to the user 110 that the authentication is denied.

In one example embodiment, the system 100 described above may be used to authenticate payment transactions based on users' grip gestures. When a user 110 initiates a payment request on the user device 120 (e.g., via a payment application executing on a smart phone), pressure sensors on the user device 120 captures sensor data corresponding to the user's grip gesture 130. Authentication system 150 then compares the pressure gradient mapping 140 corresponding to the user's grip gesture 130 with registered pressure gradient mappings 140. Authentication system 150 approves the payment if the pressure gradient mapping 140 matches any of the registered pressure gradient mappings 156 and declines the payment otherwise.

Example Method for Grip Gesture Registration

FIG. 2 illustrates an example flowchart of a method 200 for grip gesture registration. Modifications, additions, or omissions may be made to method 200. Method 200 may include more, fewer, or other operations. For example, operations may be performed in parallel or in any suitable order. While at times discussed as system 100, authentication system 150, processor 152, user device 120 or components of any of thereof performing operations, any suitable system or components of the system may perform one or more operations of the method 200. For example, one or more operations of method 200 may be implemented, at least in part, in the form of software instructions (e.g., software instructions 158 of FIG. 1), stored on non-transitory, tangible, machine-readable media (e.g., memory 154 of FIG. 1) that when run by one or more processors (e.g., processor 152 of FIG. 1) may cause the one or more processors to perform operations 202-220.

Now referring to FIG. 2, after start, the authentication system 150 detects that a user 110 accesses security settings on a user device 120 at operation 202. As an example, and not by way of limitation, the user 110 may open an application executing on the user device 120 and access settings. The user 110 may further select options related to security settings.

At operation 204, the authentication system 150 presents, via the user device 120 to the user 110, a plurality of available authentication options.

At operation 206, the authentication system 150 receives from the user device 120, a user selection of an authentication option using grip gestures.

At operation 208, the authentication system 150 prompts, via the user device 120, the user 110 to create a grip gesture.

At operation 210, the authentication system 150 receives sensor data corresponding to the user performing a grip gesture. In particular embodiments, the sensor data is captured by one or more sensors associated with the user device 120. The sensors may measure pressure distribution and grip dynamics. The sensor data may include information about the pressure exerted by the user's grip and the pressure gradients across the surface of the user device 120.

At operation 212, the authentication system 150 extracts one or more features from the sensor data. As an example, and not by way of limitation, the features may include one or more of pressure distribution, timing, or spatial coordinates. Pressure distribution may be extracted by analyzing the pressure exerted by different parts of hands during the gesture. Timing may be extracted by capturing the timing of pressure changes to understand the dynamics of the gesture. Spatial coordinates may record the spatial coordinates of touch points to understand the shape and trajectory of the gesture. Additionally, the authentication system 150 may extract pressure gradients by calculating gradients to understand how pressure changes across the surface of the user device 120.

At operation 214, the authentication system 150 normalizes the extracted features based on one or more of scaling pressure values associated with pressure distribution, standardizing timing, or standardizing spatial coordinates. Normalizing features may ensure consistency and comparability across different users and devices.

At operation 216, the authentication system 150 generates a registered pressure gradient mapping based on the normalized features. In particular embodiments, the authentication system 150 may calculate pressure values at different surface points based on the following Gaussian distribution:

$$P(x, y) = \frac{1}{2\pi\sigma^2} e^{-[(x-\mu_x)^2 + (y-\mu_y)^2]/(2\sigma^2)}.$$

P(x, y) represents the pressure value at a point (x, y) on the surface of the user device 120. $\mu_x$ and $\mu_y$ are the mean values of the pressure distribution along the x and y axes, respectively. $\sigma$ is the standard deviation of the pressure distribution.

The peak of the Gaussian would represent the area of highest pressure, typically where the fingers apply the most force, and its tappers off towards the edges where the pressure is lower.

Instead of focusing alone on absolute pressure values the authentication system 150 can also calculate the gradient of pressure changes across the sensor surface. In particular embodiments, generating a pressure gradient mapping may be based on a function of pressure gradient and touch point like [fn(x, y), fn($x_1$, $y_1$), fn($x_2$, $y_2$), . . . ].

The parameters $\mu_x$, $\mu_y$, and $\sigma$ can be determined through calibration, where the user 110 performs several grip gestures to establish their unique pressure signature. This calibration data is then used to authenticate the user 110 by comparing the pressure distribution of a new grip gesture against the stored signature.

At operation 218, the authentication system 150 stores, in a memory 154, the registered pressure gradient mapping corresponding to the user-performed grip gesture. In some embodiments, storing the registered pressure gradient mapping may be after the user 110 confirms the created grip gesture. The registered grip gesture will be used for comparison during authentication.

At operation 220, the authentication system 150 determines whether the user 110 has more grip gestures to register. If the user 110 has more grip gestures to register, the method 200 returns to operation 208. If the user does not have more grip gestures to register, method 200 then ends. Example Method for Grip Gesture Authentication FIGS. 3A-3B illustrate an example flowchart of a method 300 for grip gesture authentication. Modifications, additions, or omissions may be made to method 300. Method 300 may include more, fewer, or other operations. For example, operations may be performed in parallel or in any suitable order. While at times discussed as system 100, authentication system 150, processor 152, user device 120 or components of any of thereof performing operations, any suitable system or components of the system may perform one or more operations of the method 200. For example, one or more operations of method 200 may be implemented, at least in part, in the form of software instructions (e.g., software instructions 158 of FIG. 1), stored on non-transitory, tangible, machine-readable media (e.g., memory 154 of FIG. 1) that when run by one or more processors (e.g., processor 152 of FIG. 1) may cause the one or more processors to perform operations 302-324.

Now referring to FIG. 3A, after start, the authentication system 150 receives a request from a user 110 to process an interaction at operation 302. As an example, and not by way of limitation, the user 110 may open an application executing on the user device 120 and then request an interaction from the application.

At operation 304, the authentication system 150 accesses sensor data associated with a first grip gesture performed by the user 110. The first grip gesture is associated with the request to process the interaction. In particular embodiments, the sensor data comprises at least pressure data captured by one or more pressure sensors associated with the user device 120. As an example, and not by way of limitation, when the user 110 grips the user device 120, pressure sensors embedded in the user device 120 may capture the pressure exerted by the fingers.

At operation 306, the authentication system 150 extracts one or more features from the sensor data. As an example, and not by way of limitation, the one or more features may comprise pressure distribution, timing, and spatial coordinates. In particular embodiments, the captured sensor data is analyzed to create a pressure distribution map, which reflects the unique grip pattern of the user.

At operation 308, the authentication system 150 generates, based on the extracted features comprising pressure distribution, a first pressure gradient mapping for the first grip gesture. In other words, the captured data is analyzed to create a pressure distribution map, which reflects the unique grip pattern of the user 110. In some embodiments, specific features from the pressure distribution map may be extracted. These features may include the intensity, location, and spread of pressure points.

At operation 310, the authentication system 150 compares the first pressure gradient mapping with each of the registered pressure gradient mappings stored in the memory 154. The registered pressure gradient mappings are unique to the user 110 and are created during an initial setup or registration phase. In some embodiments, the comparison may be based on the features including the intensity, location, and spread of pressure points.

At operation 312, the authentication system 150 determine whether the first pressure gradient mapping matches any of the registered pressure gradient mappings. In one embodiment, the authentication system 150 may calculate a respective score for the comparison between the first pressure gradient mapping and each of the one or more registered pressure gradient mappings. Each score may indicate a distribution difference between the first pressure gradient mapping and each of the one or more registered pressure gradient mappings. The authentication system 150 may determine whether each of the scores is within a threshold value. Accordingly, determining whether the first pressure gradient mapping matches at least one of the registered pressure gradient mappings is further based on whether each of the scores is within the threshold value. If the first pressure gradient mapping does not match any of the registered pressure gradient mappings, the authentication system 150 declines the interaction at operation 314. Method 300 then ends. If the first pressure gradient mapping matches any of the registered pressure gradient mappings, method 300 proceeds to operation 316.

Now referring to FIG. 3B, at operation 316, the authentication system 150 inputs the extracted features comprising timing and spatial coordinates to a machine-learning model configured to authenticate users 110 based on features associated with grip gestures. The machine-learning model can be trained as follows. The authentication system 150 may access sensor data associated with a plurality of grip gestures performed by a plurality of users. The authentication system 150 may train a baseline machine-learning model for authenticating users based on grip gestures based on the accessed sensor data. The baseline machine-learning model can be further finetuned based on sensor data associated with grip gestures performed by the user to generate the machine-learning model used in operation 316.

At operation 318, the authentication system 150 accesses a confidence score outputted by the machine-learning model. The confidence score indicates a likelihood that the user 110 performed the first grip gesture.

At operation 320, the authentication system 150 determines, based on the confidence score, whether the user performed the first grip gesture. If the user 110 did not perform the first grip gesture, the authentication system 150 declines the interaction at operation 322. Method 300 then ends. If the user 110 performed the first grip gesture, method 300 proceeds to operation 324.

At operation 324, the authentication system 150 approves the interaction. Method 300 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "operation for" are explicitly used in the particular claim.

The invention claimed is:

1. A system for performing user authentication, comprising:
  a memory operable to store one or more registered pressure gradient mappings corresponding to one or more registered grip gestures associated with a user; and
  a processor, operably coupled to the memory, and configured to:
    receive a request to perform an interaction;
    access sensor data associated with a first grip gesture performed by the user, wherein the first grip gesture is associated with the request to perform the interaction, and wherein the sensor data comprises at least pressure data captured by one or more pressure sensors;
    generate, based on the sensor data, a first pressure gradient mapping for the first grip gesture;
    determine whether the first pressure gradient mapping matches at least one of the registered pressure gradient mappings based on a comparison between the first pressure gradient mapping and each of the one or more registered pressure gradient mappings;
    if the first pressure gradient mapping matches at least one of the registered pressure gradient mappings, approve the interaction; and
    if the first pressure gradient mapping does not match at least one of the registered pressure gradient mappings, decline the interaction.

2. The system of claim 1, wherein the processor is further configured to:
  extract one or more features from the first pressure gradient mapping, wherein the one or more features are based one or more of an intensity, a location, or a spread of pressure points, and wherein the comparison between the first pressure gradient mapping and each of the one or more registered pressure gradient mappings is based on the extracted features.

3. The system of claim 1, wherein the processor is further configured to:
  calculate a respective score for the comparison between the first pressure gradient mapping and each of the one or more registered pressure gradient mappings, wherein each score indicates a distribution difference between the first pressure gradient mapping and each of the one or more registered pressure gradient mappings; and
  determine whether each of the scores is within a threshold value;
  wherein determining whether the first pressure gradient mapping matches at least one of the registered pressure gradient mappings is further based on whether each of the scores is within the threshold value.

4. The system of claim 1, wherein generating the first pressure gradient mapping comprises:
  calculating, based on a Gaussian function, a plurality of gradients corresponding to pressure changes across a sensor surface associated with a user device on which the user performed the first grip gesture.

5. The system of claim 4, wherein the Gaussian function is based on a plurality of parameters, wherein the processor is further configured to:
  transmit instructions for prompting the user to register grip gestures for authentication;
  access sensor data associated with a plurality of grip gestures performed by the user; and
  determine the plurality of parameters based on a calibration of the sensor data.

6. The system of claim 1, wherein the memory is further operable to store a machine-learning model configured to authenticate users based on features associated with grip gestures, wherein the processor is further configured to:
  extract one or more features from the sensor data, wherein the one or more features comprise one or more of pressure distribution, timing, or spatial coordinates;
  determine whether the user performed the first grip gesture by inputting the extracted features to the machine-learning model, the machine-learning model outputting a confidence score indicating a likelihood that the user performed the first grip gesture;
  if the user performed the first grip gesture, approve the interaction; and
  if the user did not perform the first grip gesture, decline the interaction.

7. The system of claim 6, wherein the processor is further configured to:
  normalize the extracted features based on one or more of scaling pressure values associated with pressure distribution, standardizing timing, or standardizing spatial coordinates.

8. The system of claim 6, wherein the processor is further configured to:
  access sensor data associated with a plurality of grip gestures performed by a plurality of users;
  train, based on the accessed sensor data, a baseline machine-learning model for authenticating users based on grip gestures; and generate the machine-learning model by finetuning the baseline machine-learning model based on sensor data associated with grip gestures performed by the user.

9. A method for performing user authentication comprising, by one or more computing systems:

receiving a request to perform an interaction;

accessing sensor data associated with a first grip gesture performed by a user, wherein the first grip gesture is associated with the request to perform the interaction, and wherein the sensor data comprises at least pressure data captured by one or more pressure sensors;

generating, based on the sensor data, a first pressure gradient mapping for the first grip gesture;

determining whether the first pressure gradient mapping matches at least one of one or more registered pressure gradient mappings corresponding to one or more registered grip gestures associated with the user based on a comparison between the first pressure gradient mapping and each of the one or more registered pressure gradient mappings;

if the first pressure gradient mapping matches at least one of the registered pressure gradient mappings, approving the interaction; and if the first pressure gradient mapping does not match at least one of the registered pressure gradient mappings, declining the interaction.

10. The method of claim 9, further comprising:

extracting one or more features from the first pressure gradient mapping, wherein the one or more features are based one or more of an intensity, a location, or a spread of pressure points, and wherein the comparison between the first pressure gradient mapping and each of the one or more registered pressure gradient mappings is based on the extracted features.

11. The method of claim 9, further comprising:

calculating a respective score for the comparison between the first pressure gradient mapping and each of the one or more registered pressure gradient mappings, wherein each score indicates a distribution difference between the first pressure gradient mapping and each of the one or more registered pressure gradient mappings; and determining whether each of the scores is within a threshold value;

wherein determining whether the first pressure gradient mapping matches at least one of the registered pressure gradient mappings is further based on whether each of the scores is within the threshold value.

12. The method of claim 9, wherein generating the first pressure gradient mapping comprises:

calculating, based on a Gaussian function, a plurality of gradients corresponding to pressure changes across a sensor surface associated with a user device on which the user performed the first grip gesture.

13. The method of claim 12, wherein the Gaussian function is based on a plurality of parameters, wherein the method further comprises:

transmitting instructions for prompting the user to register grip gestures for authentication;

accessing sensor data associated with a plurality of grip gestures performed by the user; and determining the plurality of parameters based on a calibration of the sensor data.

14. The method of claim 9, further comprising:

extracting one or more features from the sensor data, wherein the one or more features comprise one or more of pressure distribution, timing, or spatial coordinates;

determining whether the user performed the first grip gesture by inputting the extracted features to a machine-learning model configured to authenticate users based on features associated with grip gestures, the machine-learning model outputting a confidence score indicating a likelihood that the user performed the first grip gesture;

if the user performed the first grip gesture, approving the interaction; and if the user did not perform the first grip gesture, declining the interaction.

15. The method of claim 14, further comprising:

accessing sensor data associated with a plurality of grip gestures performed by a plurality of users;

training, based on the accessed sensor data, a baseline machine-learning model for authenticating users based on grip gestures; and generating the machine-learning model by finetuning the baseline machine-learning model based on sensor data associated with grip gestures performed by the user.

16. A non-transitory computer-readable medium storing instructions that when executed by a processor cause the processor to:

receive a request to perform an interaction;

access sensor data associated with a first grip gesture performed by a user, wherein the first grip gesture is associated with the request to perform the interaction, and wherein the sensor data comprises at least pressure data captured by one or more pressure sensors;

generate, based on the sensor data, a first pressure gradient mapping for the first grip gesture;

determine whether the first pressure gradient mapping matches at least one of one or more registered pressure gradient mappings corresponding to one or more registered grip gestures associated with the user based on a comparison between the first pressure gradient mapping and each of the one or more registered pressure gradient mappings;

if the first pressure gradient mapping matches at least one of the registered pressure gradient mappings, approve the interaction; and if the first pressure gradient mapping does not match at least one of the registered pressure gradient mappings, decline the interaction.

17. The non-transitory computer-readable medium of claim 16, wherein the instructions further cause the processor to:

extract one or more features from the first pressure gradient mapping, wherein the one or more features are based one or more of an intensity, a location, or a spread of pressure points, and wherein the comparison between the first pressure gradient mapping and each of the one or more registered pressure gradient mappings is based on the extracted features.

18. The non-transitory computer-readable medium of claim 16, wherein the instructions further cause the processor to:

calculate a respective score for the comparison between the first pressure gradient mapping and each of the one or more registered pressure gradient mappings, wherein each score indicates a distribution difference between the first pressure gradient mapping and each of the one or more registered pressure gradient mappings; and determine whether each of the scores is within a threshold value;

wherein determining whether the first pressure gradient mapping matches at least one of the registered pressure gradient mappings is further based on whether each of the scores is within the threshold value.

19. The non-transitory computer-readable medium of claim 16, wherein generating the first pressure gradient mapping comprises:

calculating, based on a Gaussian function, a plurality of gradients corresponding to pressure changes across a sensor surface associated with a user device on which the user performed the first grip gesture.

20. The non-transitory computer-readable medium of claim 19, wherein the Gaussian function is based on a plurality of parameters, wherein the instructions further cause the processor to:

transmit instructions for prompting the user to register grip gestures for authentication;

access sensor data associated with a plurality of grip gestures performed by the user; and determine the plurality of parameters based on a calibration of the sensor data.

\* \* \* \* \*